(12) United States Patent
Wang et al.

(10) Patent No.: US 10,477,171 B2
(45) Date of Patent: Nov. 12, 2019

(54) PROJECTION APPARATUS AND ILLUMINATION SYSTEM THEREOF

(71) Applicant: Coretronic Corporation, Hsin-Chu (TW)

(72) Inventors: Hou-Sheng Wang, Hsin-Chu (TW); Chi-Hsun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/154,678

(22) Filed: Oct. 8, 2018

(65) Prior Publication Data

US 2019/0110029 A1 Apr. 11, 2019

(30) Foreign Application Priority Data

Oct. 9, 2017 (CN) .......................... 2017 1 0927924

(51) Int. Cl.

| G03B 21/20 | (2006.01) |
|---|---|
| H04N 9/31 | (2006.01) |
| G02B 27/09 | (2006.01) |
| G03B 21/14 | (2006.01) |

(52) U.S. Cl.
CPC ....... *H04N 9/3152* (2013.01); *G02B 27/0955* (2013.01); *G03B 21/142* (2013.01); *G03B 21/204* (2013.01); *G03B 21/2066* (2013.01)

(58) Field of Classification Search
CPC .............. G03B 21/204; G03B 21/2013; G03B 21/2033; H04N 9/3158; H04N 9/3164; H04N 9/3161
See application file for complete search history.

(56) References Cited

U.S. PATENT DOCUMENTS

| 2007/0121084 A1 | 5/2007 | Chang |
| 2010/0245777 A1* | 9/2010 | Ogura ................. G02B 5/0215 353/38 |
| 2014/0211170 A1 | 7/2014 | Kitano et al. |
| 2015/0146406 A1 | 5/2015 | Chang et al. |

FOREIGN PATENT DOCUMENTS

| CN | 101937165 A | 1/2011 |
| CN | 105022214 A | 11/2015 |
| TW | 201316041 A | 4/2013 |
| TW | 201327015 A | 7/2013 |

* cited by examiner

*Primary Examiner* — Ryan D Howard

(57) ABSTRACT

An illumination system includes a plurality of light source modules and at least one condenser lens. Each of the light source modules includes a first color light source and a wavelength conversion element. The first color light source is configured to provide a first color beam as an excitation beam. The wavelength conversion element is disposed on a transmission path of the first color beam and configured to convert the first color beam into a converted beam. The at least one condenser lens is disposed on transmission paths of the plurality of converted beams from the plurality of wavelength conversion elements and the plurality of first color beams. A projection apparatus including the illumination system is also provided.

18 Claims, 11 Drawing Sheets

PROJECTION APPARATUS AND ILLUMINATION SYSTEM THEREOF

CROSS-REFERENCE TO RELATED APPLICATION

This application claims the priority benefit of China Application (CN201710927924.X filed on 2017 Oct. 9). The entirety of the above-mentioned patent application is hereby incorporated by reference herein and made a part of this specification.

FIELD OF THE INVENTION

The invention relates to a projection apparatus and an illumination system thereof, and more particularly to a projection apparatus having a plurality of light source modules and an illumination system thereof.

BACKGROUND OF THE INVENTION

In order to obtain an output with sufficient luminance from the the illumination system of a projection apparatus, a laser light source of the projection apparatus may use a laser diode array including a plurality of laser diodes and focus the laser beam onto the phosphor layer to produce an output with sufficient fluorescence intensity. The plurality of laser diodes arranged in an array may produce an output of light beams with extremely high luminous power which is used to excite phosphor, and the number of laser diodes in the array may be advantageously changed as appropriate to accommodate various projection luminances as required.

However, since thermal quenching effect of the phosphor when being heated and the light saturation when being excited under a high power in which case varying the power may not cause a varied luminance, how to overcome the problems of thermal quenching and light saturation of the phosphor to achieve an illumination system comprising a light source with sufficient luminance is actually a focus of attention for those related in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection apparatus for dispersing the energy of the phosphor on the wavelength conversion element and further improving the reliability of the projection apparatus.

The invention further provides an illumination system for dispersing the energy of the phosphor on the wavelength conversion element and further improving the reliability of the illumination system.

Other objectives and advantages of the invention can be further understood from the technical features disclosed in the invention.

In order to achieve one or a part or all of the above objectives or other objectives, an embodiment of the invention provides a projection apparatus, which includes an illumination system, a light valve and a projection lens. The illumination system includes a plurality of light source modules and at least one condenser lens. Each of the light source modules includes a first color light source and a wavelength conversion element. The first color light source is configured to provide a first color beam as an excitation beam. The wavelength conversion element is disposed on a transmission path of the first color beam and configured to convert the first color beam into a converted beam. The at least one condenser lens is disposed on transmission paths of the plurality of converted beams from the plurality of wavelength conversion elements and a plurality of first color beams, so that the plurality of converted beams and the plurality of first color beams constitute an illumination beam. The light valve is disposed on a transmission path of the illumination beam and configured to convert the illumination beam into an image beam. The projection lens is disposed on a transmission path of the image beam.

In order to achieve one or a part or all of the above objectives or other objectives, an embodiment of the invention provides an illumination system, which includes a plurality of light source modules and at least one condenser lens. Each of the light source modules includes a first color light source and a wavelength conversion element. The first color light source is configured to provide a first color beam as an excitation beam. The wavelength conversion element is disposed on a transmission path of the first color beam and configured to convert the first color beam into a converted beam. The at least one condenser lens is disposed on transmission paths of the plurality of converted beams from the plurality of wavelength conversion elements and the plurality of first color beams.

In summary, by disposing a plurality of light source modules and each light source module including the wavelength conversion element, the illumination system of the embodiment of the invention can disperse the energy of the phosphor on the wavelength conversion element, achieve the cooling effect, prevent the thermal quenching of phosphor and avoid the problem of light saturation, thereby improving the reliability of the projection apparatus and the illumination system and also increasing the upper limit of luminance of the overall illumination system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
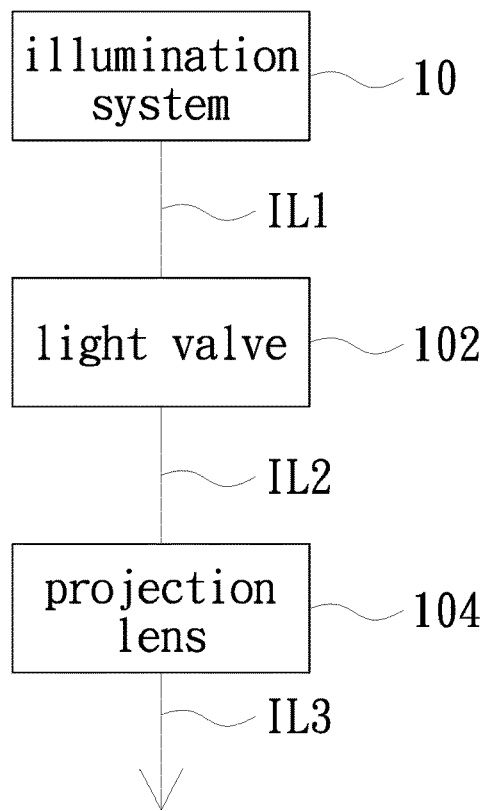
FIG. 1A is a schematic view of a projection apparatus in accordance with an embodiment of the invention.

FIG. 1A is a schematic view of a projection apparatus in accordance with an embodiment of the invention. Referring to FIG. 1A, the projection apparatus 1 of the embodiment includes an illumination system 10, a light valve 102 and a projection lens 104. The light valve 102 is disposed on the transmission path of the illumination beam IL1 provided by the illumination system 10. The light valve 102 is configured to convert the illumination beam IL1 into an image beam IL2. The projection lens 104 is disposed on the transmission path of the image beam IL2. The image beam IL2 is converted into a projection beam IL3 after passing through the projection lens 104 so as to form an image on a projection surface. Although FIG. 1A is exemplified by only one light valve 102, there may be multiple light valves 102 in other embodiments. In addition, the light valve 102 of the embodiment is exemplified by a transmissive light valve (e.g., a transmissive liquid crystal panel), but the invention is not limited thereto. In other embodiments, the light valve 102 may be a reflective light valve, such as a reflective liquid crystal panel, a digital micro-mirror device (DMD) or a liquid crystal on silicon (LCoS) panel, and the type and position of associated optical components may be adjusted as appropriate.

Figure 1B:
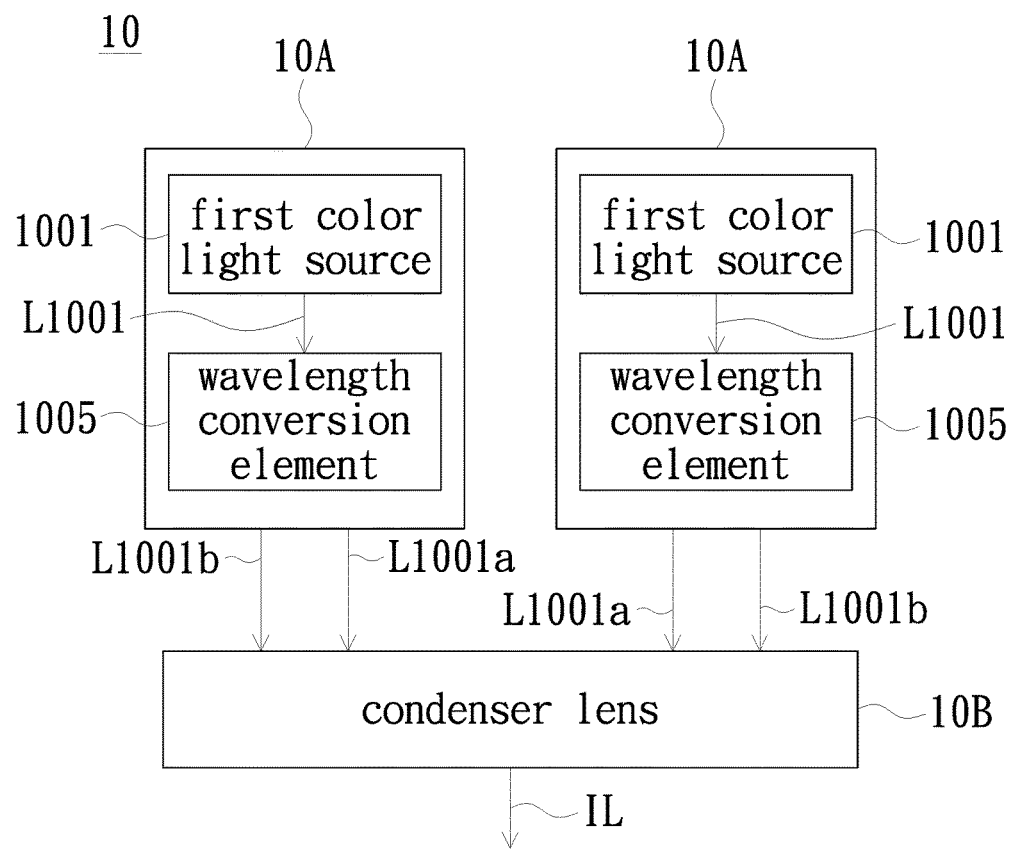
FIG. 1B is a block diagram of an illumination system in accordance with an embodiment of the invention.
Figure 1C:
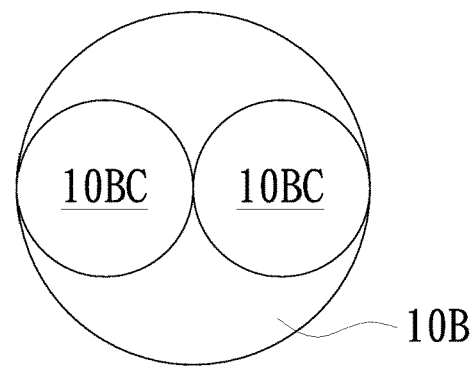
FIGS. 1C to 1E are schematic views of light spots formed on a condenser lens in accordance with some embodiments of the invention.
Figure 1D:
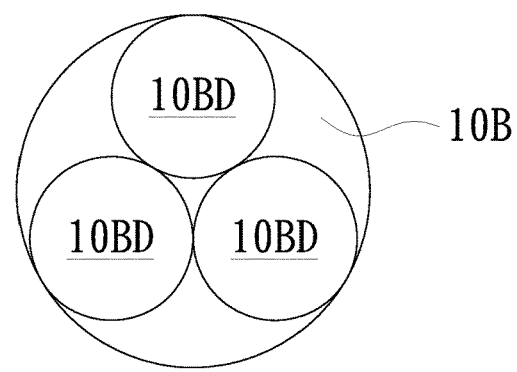
Figure 1E:
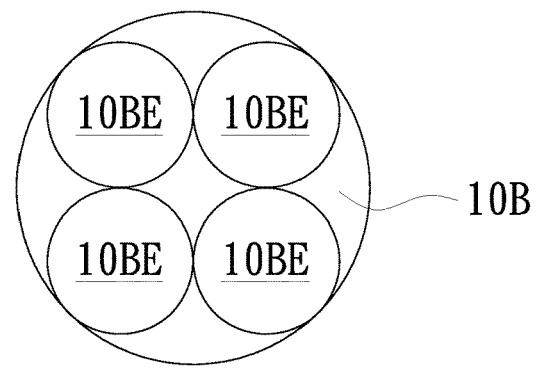

FIG. 1B is a block diagram of an illumination system in accordance with an embodiment of the invention. Referring to FIG. 1B, in the embodiment, the illumination system 10 includes a plurality of light source modules 10A (two are shown for example) and at least one condenser lens 10B (one is shown for example). In the embodiment, each light source module 10A includes a first color light source 1001 and a wavelength conversion element 1005. In the embodiment, the first color light source 1001 is configured to provide a first color beam L1001 as an excitation beam. In the embodiment, the wavelength conversion element 1005 is disposed on the transmission path of the first color beam L1001 and is configured to convert the first color beam L1001 into a converted beam L1001a. In the embodiment, the condenser lens 10B is disposed on the transmission paths of a plurality of converted beams L1001a from a plurality of wavelength conversion elements 1005 and a plurality of first color beams L1001b passing through a plurality of wavelength conversion elements 1005, so that the plurality of converted beams L1001a and the plurality of first color beams L1001b passing through the plurality of wavelength conversion elements 1005 constitute the illumination beam IL. In the embodiment of FIG. 1B, the illumination system 10 has, for example, two light source modules 10A, so that two light spots 10BC may be formed on the condenser lens 10B as shown in FIG. 1C, but the invention is not limited thereto. For example, in an unillustrated embodiment, when the illumination system has three light source modules, three light spots 10BD may be formed on the condenser lens 10B as shown in FIG. 1D. Alternatively, when the illumination system has four light source modules, four light spots 10BE may be formed on the condenser lens 10B as shown in FIG. 1E, but the invention is not limited thereto. Briefly, the plurality of light spots (e.g., light spots 10BC/10BD/10BE) formed on the condenser lens 10B are, for example, arranged side by side in an non-overlapping form. Several aspects of the illumination system will be described as follow. However, the invention is not limited to the following embodiments.

Figure 2:
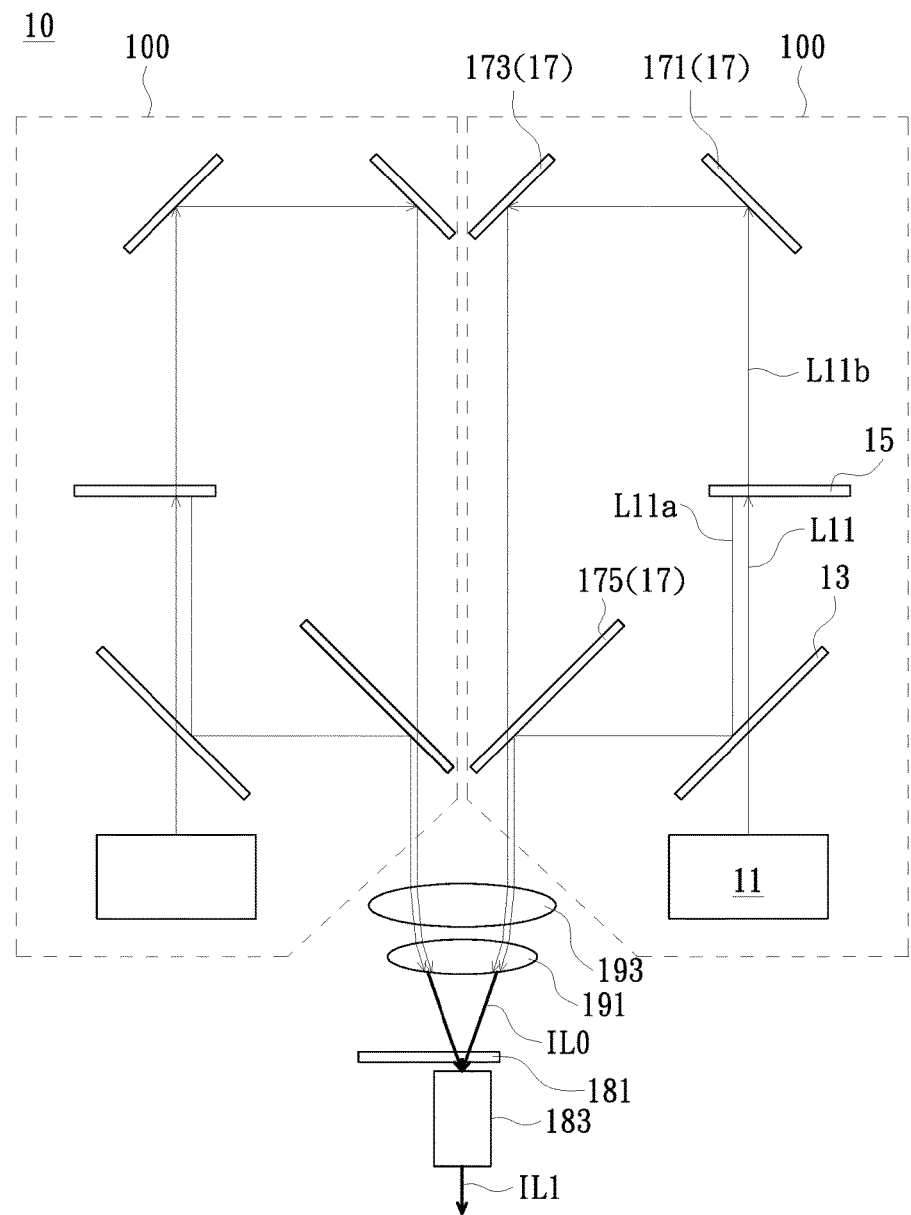
FIG. 2 is a schematic view of an illumination system in accordance with an embodiment of the invention.

FIG. 2 is a schematic view of an illumination system in accordance with an embodiment of the invention. Referring to FIG. 2, the illumination system 10 of the embodiment includes, for example, two light source modules 100 and two condenser lenses 191, 193. In order to simplify the description, the component symbols for the light source module 100 on the left side of FIG. 2 are omitted. Each light source module 100 includes a first color light source 11 and a wavelength conversion element 15. The first color light source 11 is configured to provide a first color beam L11 as an excitation beam. The wavelength conversion element 15 is disposed on the transmission path of the first color beam L11 and is configured to convert the first color beam L11 into a converted beam L11a. In the embodiment, the condenser lenses 193, 191 are disposed on the transmission paths of the converted beams L11a and the first color beams L11b passing through the wavelength conversion elements 15 of the two light source modules 100, so that the converted beams L11a and the first color beams L11b constitute an illumination beam IL0. Therefore, by disposing a plurality of light source modules 100 and each light source module 100 including the wavelength conversion element 15, the illumination system 10 of the embodiment can disperse the energy of the phosphor on the wavelength conversion element 15, achieve the cooling effect, prevent the thermal quenching of phosphor and avoid the problem of light saturation, thereby achieving the object of increasing the upper limit of luminance of the overall illumination system.

The illumination system 10 of the embodiment is exemplified by including two light source modules 100, but the invention is not limited thereto. In other embodiments of the invention, the illumination system may include more light source modules for the purpose of dispersing the energy of the phosphor on each wavelength conversion element. In addition, the illumination system 10 of the embodiment is exemplified by including two condenser lenses 191, 193, but the invention is not limited thereto. In other embodiments of the invention, the illumination system may include one or more than two condenser lenses to generate the illumination beam.

Figure 3:
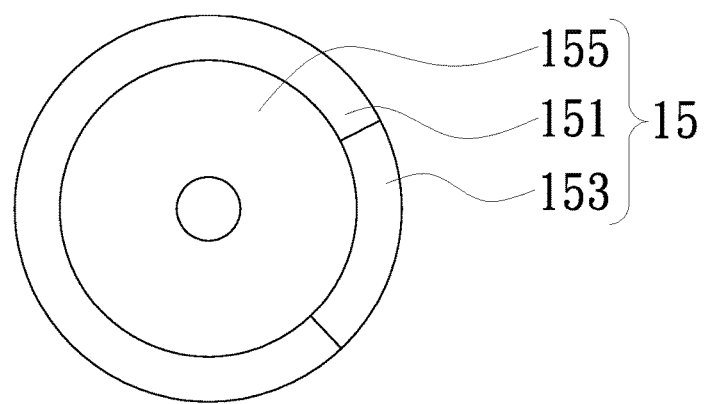
FIG. 3 is a schematic view of the wavelength conversion element in FIG. 2.

FIG. 3 is a schematic view of the wavelength conversion element in FIG. 2. As shown in FIG. 3, in the embodiment, the wavelength conversion element 15 of the light source module 100 has a reflective wavelength conversion portion 151 and a light transmissive portion 153. Specifically, in the embodiment, the wavelength conversion element 15 is, for example, a phosphor wheel and includes a turntable 155 and a motor (not shown) for driving the turntable 155 to rotate. In the embodiment, the reflective wavelength conversion portion 151 is disposed on the turntable 155, and the turntable 155 has a light transmissive portion 153 described above. In the embodiment, the reflective wavelength conversion portion 151 has phosphors, and the phosphors are phosphors for yellow for example, but the invention is not limited thereto. In other embodiments, the reflective wavelength conversion part 151 may have a plurality of zones to respectively dispose a plurality of phosphors for different colors, such as phosphors for yellow and phosphors for green. In the embodiment, as the turntable 155 rotates, the first color beam L11 is irradiated toward the reflective wavelength conversion portion 151 and the light transmissive portion 153 by turns. The converted beam L11a refers to the first color beam L11 that is converted by the reflective wavelength conversion portion 151 and the first color beam L11b refers to the first color beam L11 that passes through the light transmissive portion 153. More specifically, in the embodiment, when the reflective wavelength conversion part 151 is rotated to be located on the transmission path of the first color beam L11, the first color beam L11 is converted into the converted beam L11a by the reflective wavelength conversion unit 151. On the other hand, in the embodiment, when the light transmissive portion 153 is rotated to be located on the transmission path of the first color beam L11, the first color beam L11b penetrates the light transmissive portion 153.

Referring to FIG. 2 and FIG. 3, in the embodiments, the reflective wavelength conversion portion 151 is configured to convert the first color beam L11 into the converted beam L11a and reflect the converted beam L11a. The light transmissive portion 153 is configured to allow the first color beam L11b to penetrate therethrough. In the embodiment, when the turntable 155 was driven to rotate by the motor, the first color beam L11 provided by the first color light source 11 is irradiated toward the reflective wavelength conversion portion 151 and the light transmissive portion 153 by turns. Through reflective wavelength conversion portion 151, the first color beam L11 is used to excite the phosphor to generate the converted beam L11a and then the converted beam L11a was reflected, and the light transmissive portion 153 allows the first color beam L11b to penetrate therethrough. Specifically, in the embodiment, the reflective wavelength conversion part 151 may further be disposed with a reflective layer or reflective coating layer (not shown), and the phosphor is disposed on the reflective layer or the reflective coating layer to reflect the beam generated from the phosphor to increase the usage of the converted beam L11a reflected, but the invention is not limited thereto. In the embodiment, the first color beam L11 is a blue beam and the converted beam L11a is a yellow beam for example, but the invention is not limited thereto. In an embodiment, the blue beam is, for example, a beam having a wavelength of 420-470 nanometers (nm), but the invention is not limited thereto. In the embodiment, the light source module 100 on the left in FIG. 2 has the same structure and function as the light source module 100 on the right in FIG. 2, and no redundant detail is to be given herein.

In addition, in the embodiment, the light source module 100 further includes, for example, a first light combining device 13 and a second light combining device 17. The first light combining device 13 is disposed between the first color light source 11 and the wavelength conversion element 15 and is configured to allow the first color beam L11 from the first color light source 11 to penetrate therethrough and reflect the converted beam L11a from the reflective wavelength conversion portion 151 of the wavelength conversion element 15. In the embodiment, the second combining device 17 is disposed on the optical path between the wavelength conversion element 15 and the condenser lenses 191, 193 and is disposed on the transmission paths of the converted beams L11a from the wavelength conversion element 15 and the first color beams L11b. In the embodiment, the converted beam L11a and the first color beam L11b are transmitted to the condenser lenses 193, 191 via the second light combining device 17.

In addition, in the embodiment, the first light combining device 13 of the light source module 100 is, for example, a dichroic element. The first light combining device 13 is disposed between the first color light source 11 and the wavelength conversion element 15 and is configured to allow the first color beam L11 from the first color light source 11 to penetrate therethrough and reflect the converted beam L11a from the wavelength conversion element 15. In the embodiment, the second light combining device 17 of the light source module 100 includes, for example, a reflective element 171, a reflective element 173 and a dichroic element 175. In the embodiment, the reflective element 171 is disposed on the optical path between the wavelength conversion element 15 and the condenser lenses 191, 193 and is configured to reflect the first color beam L11b passing through the wavelength conversion element 15 to the reflective element 173. In the embodiment, the reflective element 173 is disposed between the reflective element 171 and the dichroic element 175 and is configured to reflect the first color beam L11b reflected from the reflective element 171 to the dichroic element 175. In the embodiment, the dichroic element 175 is disposed between the reflective element 171 and the condenser lenses 191, 193 and is configured to allow the first color beam L11b reflected sequentially from the reflective elements 171, 173 to penetrate therethrough and reflect the converted beam L11a from the first light combining device 13 (dichroic element), so that the converted beams L11a and the first color beams L11b are transmitted to the condenser lenses 193, 191 to constitute the illumination beam IL0.

Therefore, in the embodiment, by the configuration of the first light combining device 13 (dichroic element), the reflective element 171, the dichroic element 175 and the reflective element 173, the converted beams L11a and the first color beams L11b are transmitted to the condenser lenses 193, 191 to constitute the illumination beam IL0.

In addition, in the embodiment, the illumination system 10 may further include, for example, a color wheel 181 and a light integration rod 183. The color wheel 181 is disposed between the light integration rod 183 and the condenser lenses 191, 193. In the embodiment, the color wheel 181 is, for example, a filter wheel configured to filter a beam. In the embodiment, the illumination beam IL0 from the condenser lenses 191, 193 is filtered by the color wheel 181 and then homogenized by the light integration rod 183 to generate the illumination beam ILL In the embodiment, the light integration rod 183 may be a hollow light integration rod or a solid light integration rod for example, and the invention is not limited thereto. In the embodiment, the incident angle of the illumination beam IL0 on the light integration rod 183 is, for example, between 0° and 30°, and the invention is not limited thereto. In an embodiment, the incident angle of the illumination beam IL0 on the light integration rod 183 may be between 0° and 15°, and the invention is not limited thereto.

Figure 4:
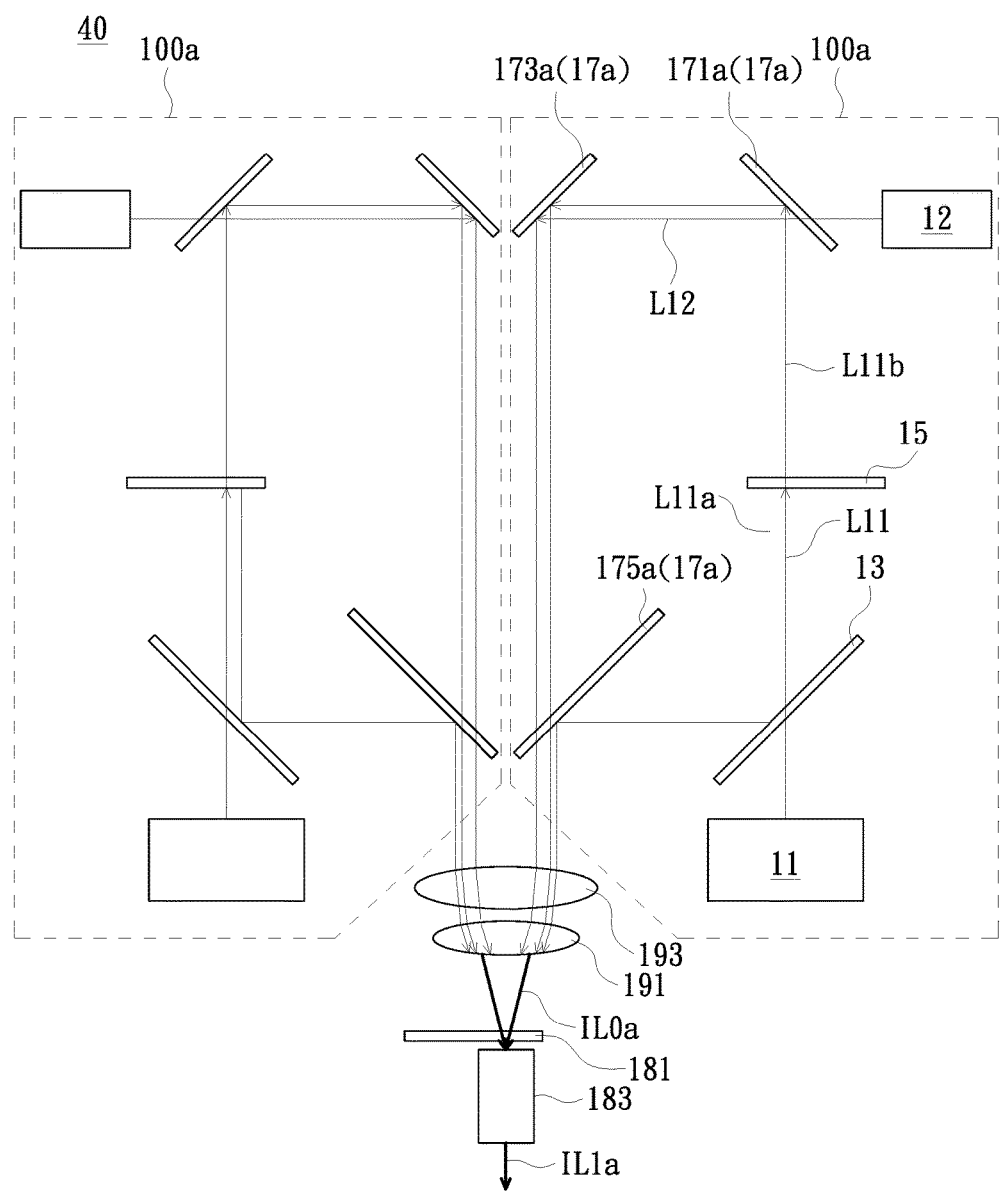
FIG. 4 is a schematic view of an illumination system in accordance with another embodiment of the invention.

FIG. 4 is a schematic view of an illumination system in accordance with another embodiment of the invention. Referring to FIG. 4. In the embodiment, the illumination system 40 includes two light source modules 100a, two condenser lenses 191, 193, a color wheel 181 and a light integration rod 183. In order to simplify the description, the component symbols for the light source module 100a on the left side in FIG. 4 are omitted. The illumination system 40 of the embodiment has a similar structure and function as the illumination system 10 shown in FIG. 2. The difference between the embodiment shown in FIG. 4 and the embodiment shown in FIG. 2 lies in that: each light source module 100a further includes a second color light source 12. The second color light source 12 is disposed next to the second light combining device 17a and is configured to provide the second color beam L12 to the second light combining device 17a. The second color beam L12, the converted beams L11a and the first color beams L11b in each of the light source modules 100a are transmitted to the condenser lenses 193, 191 by the second light combining device 17a to constitute the illumination beam IL0a.

In the embodiment, the second color beam L12 provided by the second color light source 12 may be a red beam, so as to make the projection apparatus have a better performance in red color, but the color may be adjusted according to the design requirements and the invention is not limited thereto. In an embodiment, the red beam is, for example, a laser beam having a wavelength greater than 630 nm, but the invention is not limited thereto.

In the embodiment, the first light combining device 13 is, for example, a first dichroic element. In the embodiment, the first light combining device 13 (first dichroic element) is disposed between the first color light source 11 and the wavelength conversion element 15 and is configured to allow the first color beam L11 from the first color light source 11 to penetrate therethrough and reflect the converted beam L11a converted from the wavelength conversion element 15. In addition, in the embodiment, the second light combining device 17a of the light source module 100a includes, for example, a second dichroic element 171a, a third dichroic element 175a and a reflective element 173a. In the embodiment, the second dichroic element 171a is disposed on the optical path between the wavelength conversion element 15 and the condenser lenses 191, 193 and is configured to reflect the first color beam L11b passing through the wavelength conversion element 15 to the reflective element 173a. In the embodiment, the second color light source 12 is disposed on one side of the second dichroic element 171a and is configured to provide the second color beam L12 to the second dichroic element 171a. The second dichroic element 171a is configured to allow the second color beam L12 to penetrate therethrough and to be transmitted to the reflective element 173a. In the embodiment, the reflective element 173a is disposed between the second dichroic element 171a and the third dichroic element 175a and is configured to reflect the second color beam L12 from the second dichroic element 171a and the first color beam L11b to the third dichroic member 175a. In the embodiment, the third dichroic element 175a is disposed between the second dichroic element 171a and the condenser lenses 191, 193 and is configured to allow the second color beam L12 from the second dichroic element 171a/the reflective element 173a and the first color beam L11b to penetrate therethrough and reflect the converted beam L11a from the first light combining device 13 (first dichroic element), so that the second color beams L12, the converted beams L11a and the first color beams L11b are transmitted to the condenser lenses 193, 191 to constitute the illumination beam IL0a.

Therefore, in the embodiment, by the disposition of the first dichroic element (first light combining device 13), the second dichroic element 171a, the third dichroic element 175a and the reflective element 173a, the second color beam L12, the converted beam L11a and the first color beam L11b are transmitted to the condenser lenses 193, 191 to constitute the illumination beam IL0a. In the embodiment, the illumination beam IL0a from the condenser lens 191, 193 is filtered by the color wheel 181 and then homogenized by the light integration rod 183 to generate the illumination beam IL1a.

Figure 5:
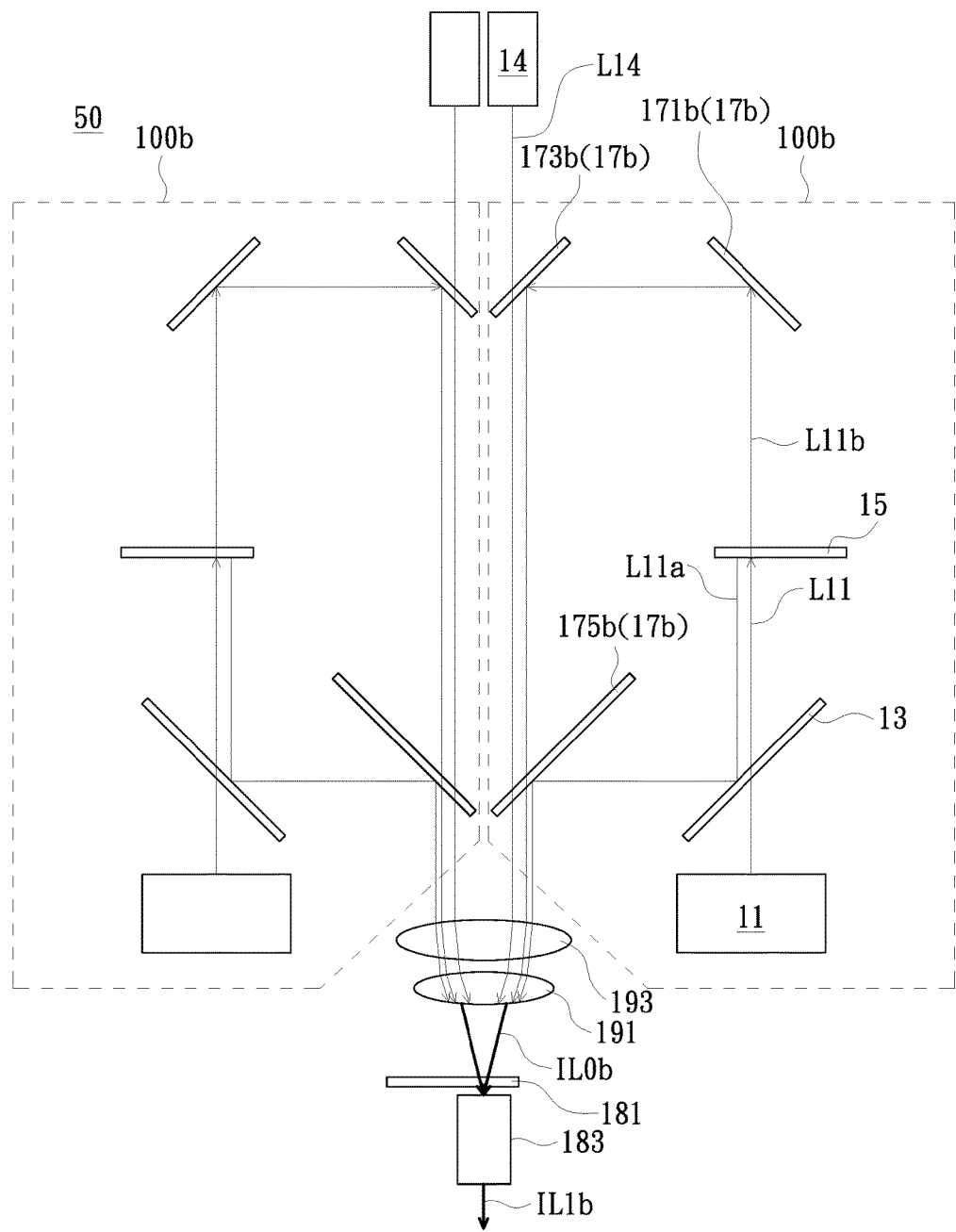
FIG. 5 is a schematic view of an illumination system in accordance with still another embodiment of the invention.

FIG. 5 is a schematic view of an illumination system in accordance with still another embodiment of the invention. Referring to FIG. 5. In the embodiment, the illumination system 50 includes two light source modules 100b, two condenser lenses 191, 193, a color wheel 181 and a light integration rod 183. In order to simplify the description, the component symbols for the light source module 100b on the left side in FIG. 5 are omitted. The illumination system 50 of the embodiment has a similar structure and function as the illumination system 10 shown in FIG. 2. The difference between the embodiment shown in FIG. 5 and the embodiment shown in FIG. 2 lies in that: the light source module 100b further includes a second color light source 14, the second light combining device 17b of the light source module 100b may include, for example, a second dichroic element 171b, a third dichroic element 175b and a fourth dichroic element 173b, and the second color light source 14 is disposed next to the fourth dichroic element 173b.

In the embodiment, the second dichroic element 171b is disposed on the optical path between the wavelength conversion element 15 and the condenser lenses 191, 193 and is configured to reflect the first color beam L11b passing through the wavelength conversion element 15 to the fourth dichroic element 173b. In the embodiment, the third dichroic element 175b is disposed between the second dichroic element 171b and the condenser lenses 191, 193 and is configured to allow the first color beam L11b reflected from the second dichroic element 171b/the fourth dichroic element 173b to penetrate therethrough and reflect the converted beam L11a from the first light combining device 13 (first dichroic element), so that the converted beams L11a and the second color beams L11b are transmitted to the condenser lenses 193, 191. In the embodiment, the fourth dichroic element 173b is disposed between the second dichroic element 171b and the third dichroic element 175b and is configured to reflect the first color beam L11b from the second dichroic element 171b to the third dichroic element 175b. In the embodiment, the second color light source 14 is disposed on one side of the fourth dichroic element 173b and is configured to provide the second color beam L14 to the fourth dichroic element 173b. The fourth dichroic element 173b is configured to allow the second color beam L14 to penetrate therethrough and to be transmitted to the third dichroic element 175b. The third dichroic element 175b is configured to allow the second color beam L14 to penetrate therethrough and to be transmitted to the condenser lenses 193, 191. Thus, the second color beam L14, the converted beam L11a and the first color beam L11b constitute the illumination beam IL0b. In the embodiment, the illumination beam IL0b from the condenser lenses 191, 193 is filtered by the color wheel 181 and then homogenized by the light integration rod 183 to generate the illumination beam IL1b.

In the embodiment, the second color beam L14 provided by the second color light source 14 may be a red beam, so as to make the projection apparatus have a better performance in red color, but the color may be adjusted according to the design requirements and the invention is not limited thereto.

Figure 6:
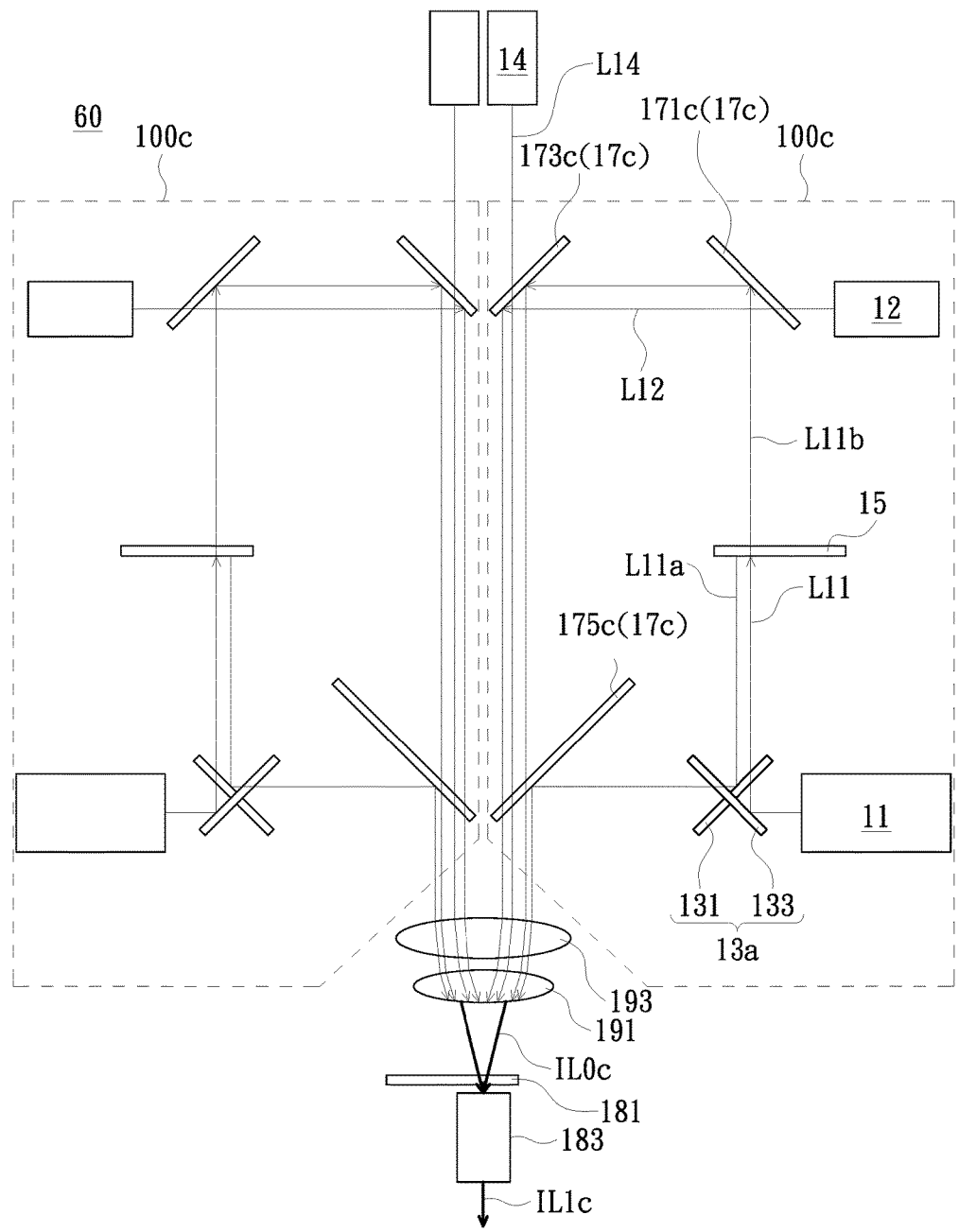
FIG. 6 is a schematic view of an illumination system in accordance with still another embodiment of the invention.

FIG. 6 is a schematic view of an illumination system in accordance with still another embodiment of the invention. Referring to FIG. 6. In the embodiment, the illumination system 60 includes two light source modules 100c, two condenser lenses 191, 193, a color wheel 181 and a light integration rod 183. In order to simplify the description, the component symbols for the light source module 100c on the left side in FIG. 6 are omitted. The illumination system 60 of the embodiment has a similar structure and function as the illumination system 40/50 shown in FIG. 4/5. The difference between the embodiment shown in FIG. 6 and the embodiment shown in FIG. 4/5 lies in that: the position of the first color light source 11, the two second color light sources (the second color light sources 12, 14) and the first light combining devices 13a including two first dichroic elements 131, 133.

In the embodiment, the first dichroic elements 131, 133 are disposed to cross each other and are disposed between the first color light source 11 and the wavelength conversion element 15. In the embodiment, the first dichroic element 133 is configured to reflect the first color beam L11 from the first color light source 11 to the wavelength conversion element 15 and allow the converted beam L11a from the wavelength conversion element 15 to penetrate therethrough. In the embodiment, the first dichroic element 131 is configured to reflect the converted beam L11a from the wavelength conversion element 15 and allow the first color beam L11 from the first color light source 11 to penetrate therethrough. In the embodiment, the first dichroic elements 131, 133 are, for example, disposed to cross each other to form an X dichroic element, and the invention is not limited thereto.

In the embodiment, the second light combining device 17c of the light source module 100c includes, for example, a second dichroic element 171c, a third dichroic element 175c and an optical element 173c. In the embodiment, the second dichroic element 171c is disposed on the optical path between the wavelength conversion element 15 and the condenser lenses 191, 193 and is configured to reflect the first color beam L11b passing through the wavelength conversion element 15 to the optical element 173c. In the embodiment, the third dichroic element 175c is disposed between the second dichroic element 171c and the condenser lenses 191, 193 and is configured to allow the first color beam L11b reflected from the second dichroic element 171c/the optical element 173c to penetrate therethrough and reflect the converted beam L11a from the first dichroic elements 131, 133. Thus, the converted beams L11a and the first color beams L11b can be transmitted to the condenser lenses 193, 191. In the embodiment, the optical element 173c is disposed between the second dichroic element 171c and the third dichroic element 175c and is configured to reflect the first color beam L11b from the second dichroic element 171c to the third dichroic element 175c. In the embodiment, the second color light sources 12 and 14 are disposed on one side of the second dichroic element 171c and the optical element 173c respectively. In the embodiment, the second color light source 12 is disposed next to the second dichroic element 171c and is configured to provide the second color beam L12 to the second dichroic element 171c. In the embodiment, the second color light source 14 is disposed next to the optical element 173c and is configured to provide the second color beam L14 to the optical element 173c. In the embodiment, the optical element 173c is configured to reflect the second color beam L12 and allow the second color beam L14 to penetrate therethrough, so that the second color beams L12, L14 are transmitted to the third dichroic element 175c. In the embodiment, the third dichroic element 175c is configured to allow the second color beams L12, L14 to penetrate therethrough so that the second color beams L12, L14 are transmitted to the condenser lenses 193, 191. Thus, the second color beams L12, L14, the converted beam L11a and the first color beam L11b constitutes the illumination beam IL0c. In the embodiment, the illumination beam IL0c is filtered by the color wheel 181 and then homogenized by the light integration rod 183 to generate the illumination beam IL1c.

In the embodiment, the colors/wavelengths of the second color beams L12, L14 respectively provided by the second color light sources 12, 14 may be the same or different. In the embodiment, the optical element 173c may be a dichroic element or a half-penetration-and-half-reflection element (e.g., a half mirror) and is determined based on the color of the second color beams L12, L14.

Figure 7:
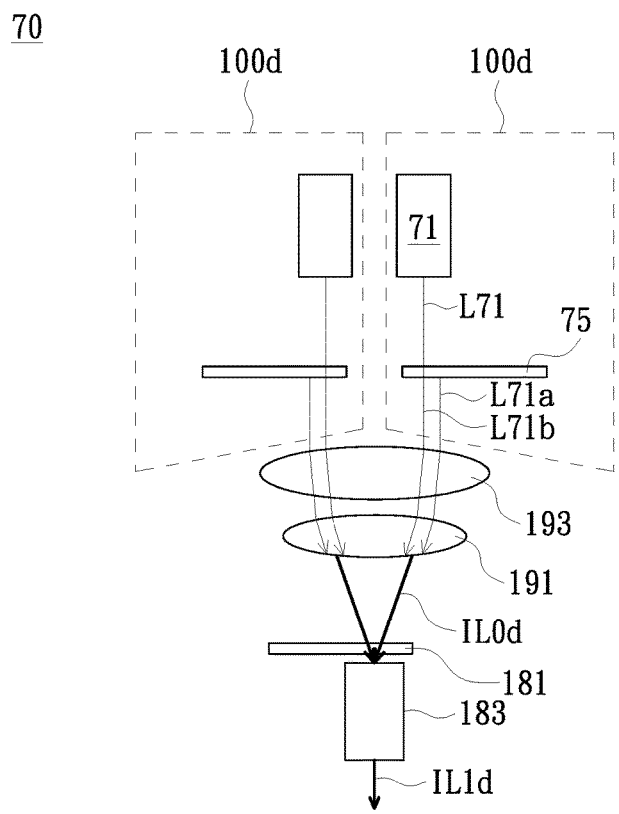
FIG. 7 is a schematic view of an illumination system in accordance with still another embodiment of the invention.

FIG. 7 is a schematic view of an illumination system in accordance with still another embodiment of the invention. Referring to FIG. 7. In the embodiment, the illumination system 70 includes two light source modules 100d and two condenser lenses 191, 193. Each of the light source modules 100d includes a first color light source 71 and a wavelength conversion element 75. In order to simplify the description, the component symbols for the light source module 100d on the left side in FIG. 7 are omitted. The first color light source 71 is configured to provide the first color beam L71 as an excitation beam. The wavelength conversion element 75 is disposed on the transmission path of the first color beam L71 and is configured to convert the first color beam L71 into a converted beam L71a.

In the embodiment, the condenser lenses 193, 191 are disposed on the transmission paths of the converted beam L71a from the wavelength conversion element 75 and the first color beam L71b, so that the converted beam L71a and the first color beam L71b constitute the illumination beam IL0d. Therefore, by disposing a plurality of light source modules 100d and each light source module 100d including the wavelength conversion element 75, the illumination system 70 of the embodiment can disperse the energy of the phosphor on the wavelength conversion element 75, achieve the cooling effect, prevent the thermal quenching of phosphor and avoid the problem of light saturation, thereby improving the reliability of the projection apparatus and the illumination system and also increasing the upper limit of luminance of the overall illumination system.

The illumination system 70 of the embodiment is described by taking including two light source modules 100d as an example, but the invention is not limited thereto. In other embodiments of the invention, the illumination system may include more light source modules for the purpose of dispersing the energy of the phosphor on each wavelength conversion element.

Figure 8:
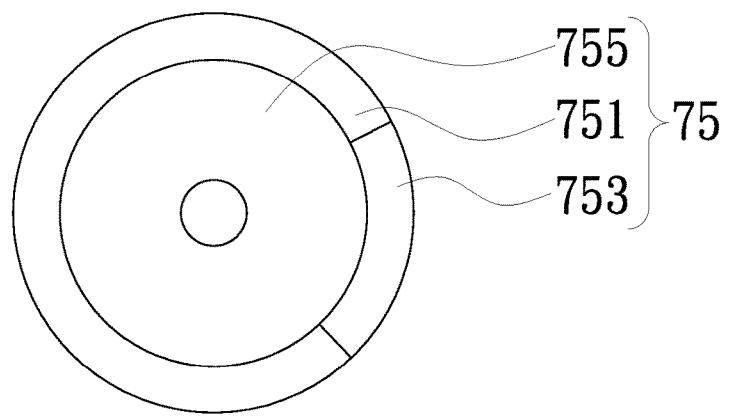
FIG. 8 is a schematic view of the wavelength conversion element in FIG. 7.

FIG. 8 is a schematic view of the wavelength conversion element in FIG. 7. As shown in FIG. 8, in the embodiment, the wavelength conversion element 75 of the light source module 100d has a transmissive wavelength conversion portion 751 and a light transmissive portion 753. Specifically, in the embodiment, the wavelength conversion element 75 is, for example, a phosphor wheel and includes a turntable 755 and a motor (not shown) for driving the turntable 755 to rotate. In the embodiment, the transmissive wavelength conversion portion 751 is disposed on the turntable 755 and includes a phosphor, wherein the phosphor is a yellow phosphor for example, but the invention is not limited thereto. In other embodiments, the transmissive wavelength conversion part 751 may have a plurality of zones to respectively dispose a plurality of phosphors of different colors. The turntable 755 may have the above-mentioned transmissive wavelength conversion portion 751 and is configured to convert the first color beam L71 into a converted beam L71a and allow the converted beam L71a to penetrate therethrough and to be transmitted to the condenser lenses 193, 191. The light transmissive portion 753 is configured to allow the first color beam L71b to penetrate therethrough and to be transmitted to the condenser lenses 193, 191. In the embodiment, when the motor drives the turntable 755 to rotate, the first color beam L71 provided by the first color light source 71 is irradiated toward the transmissive wavelength conversion portion 751 and the light transmissive portion 753 by turns. Thus, the first color beam L71 excites the phosphor to generate the converted beam L71a, the converted beam L71a penetrates the transmissive wavelength conversion portion 751, and the first color beam L71b penetrates the light transmissive portion 753. The first color beam L71 in the embodiment is a blue beam and the converted beam L71a is a yellow beam for example, but the invention is not limited thereto.

Figure 9:
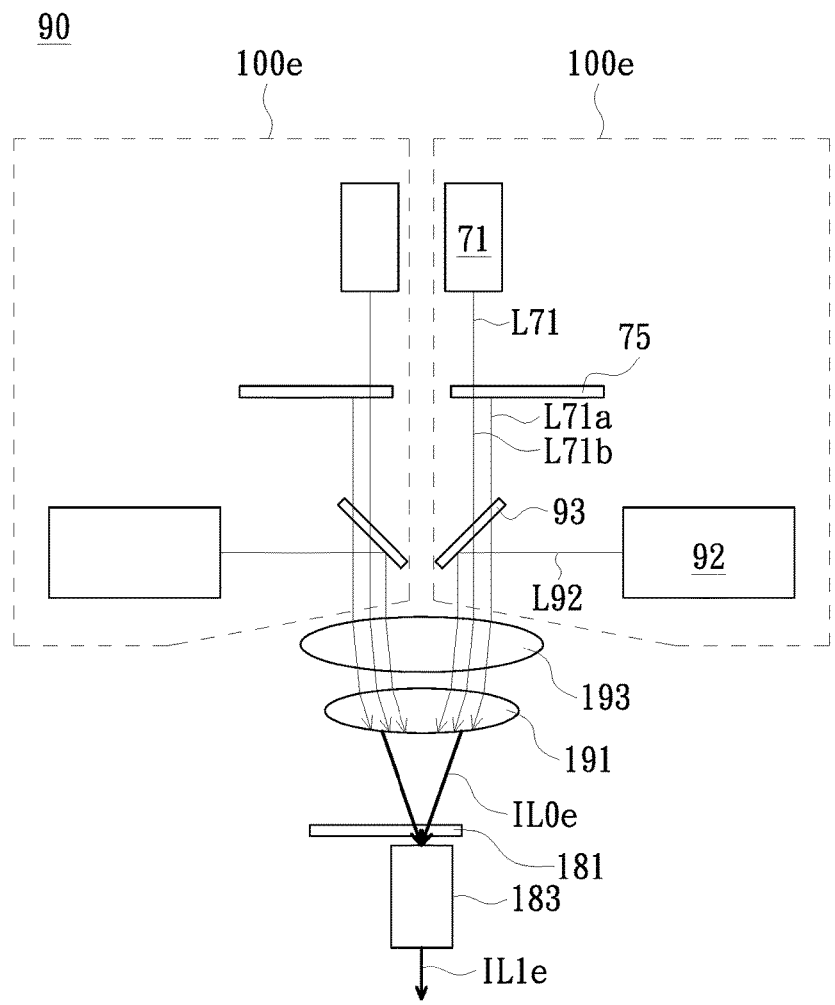
FIG. 9 is a schematic view of an illumination system in accordance with still another embodiment of the invention.

FIG. 9 is a schematic view of an illumination system in accordance with still another embodiment of the invention. Referring to FIG. 9. In the embodiment, the illumination system 90 includes two light source modules 100e, two condenser lenses 191, 193, a color wheel 181 and a light integration rod 183. In order to simplify the description, the component symbols for the light source module 100e on the left side in FIG. 9 are omitted. The illumination system 90 of the embodiment has a similar structure and function as the illumination system 70 shown in FIG. 7. The difference between the embodiment shown in FIG. 9 and the embodiment shown in FIG. 7 lies in that: each of the light source modules 100e further includes a dichroic element 93 and a second color light source 92. In the embodiment, the dichroic element 93 is disposed between the wavelength conversion element 75 and the condenser lenses 191, 193 and configured to allow the converted beam L71a and the first color beam L71b to penetrate therethrough and to be transmitted to the condenser Lens 193, 191. In the embodiment, the second color light source 92 is disposed on one side of the dichroic element 93 and is configured to provide the second color beam L92 to the dichroic element 93. The dichroic element 93 is configured to reflect the second color beam L92 to the condenser lens 193, 191.

In the embodiment, the second color beam L92, the converted beam L71a and the first color beam L71b of each light source module 100e are transmitted to the condenser lenses 193, 191 to constitute the illumination beam IL0e. The illumination beam IL0e is filtered by the color wheel 181 and then homogenized by the light integration rod 183 to generate the illumination beam IL1e.

In the embodiment, the second color beam L92 provided by the second color light source 92 may be a red beam, so as to make the projection apparatus have a better performance in red color, but the color may be adjusted according to the design requirements and the invention is not limited thereto.

In an embodiment, the optical elements such as the light combining device, the dichroic element and the lens mentioned above may be formed by spherical lenses, spherical lenses or/and plated films according to the actual requirements, and the invention is not limited thereto.

In summary, by disposing a plurality of light source modules and each light source module including the wavelength conversion element, the illumination system of the embodiment of the invention can disperse the energy of the phosphor on the wavelength conversion element, achieve the cooling effect, prevent the thermal quenching of phosphor and avoid the problem of light saturation, thereby improving the reliability of the projection apparatus and the illumination system and also increasing the upper limit of luminance of the overall illumination system. In an embodiment of the invention, the insufficient of red color and/or green color in prior art compensated to enhance the color purity of red color and/or green color. In an embodiment of the invention, by disposing a plurality of light source modules according to requirements, the projection apparatus and the illumination system thereof have a higher extensibility.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projection apparatus, comprising:
an illumination system, comprising:
a plurality of light source modules, each of the plurality of light source modules comprising:
a first color light source, configured to provide a first color beam as an excitation beam; and
a wavelength conversion element, disposed on a transmission path of the first color beam and configured to convert the first color beam into a converted beam; and
at least one condenser lens, disposed on transmission paths of a plurality of converted beams from a plurality of wavelength conversion elements and on transmission paths of a plurality of first color beams, so that the plurality of converted beams and the plurality of first color beams constitute an illumination beam, wherein a plurality of light spots are formed on the at least one condenser lens, and the number of the plurality of light spots is the same as the number of the plurality of light source modules;
a light valve, disposed on a transmission path of the illumination beam and configured to convert the illumination beam into an image beam; and
a projection lens, disposed on a transmission path of the image beam.

2. The projection apparatus according to claim 1, wherein the wavelength conversion element of each of the plurality of light source modules has a reflective wavelength conversion portion and a light transmissive portion, each of a plurality of reflective wavelength conversion portions is configured to convert a respective one of the plurality of first color beams into the converted beam and reflect the converted beam, each of a plurality of light transmissive portions is configured to allow a respective one of the plurality of first color beams to penetrate therethrough, and each of the plurality of light source modules further comprises:
a first light combining device, disposed between the first color light source and the wavelength conversion element and configured to allow the first color beam from the first color light source to penetrate therethrough or configured to reflect the first color beam from the first color light source, and configured to reflect the converted beam from the reflective wavelength conversion portion;
a second light combining device, disposed on an optical path between the wavelength conversion element and the at least one condenser lens and disposed on transmission paths of the converted beam and the first color beam penetrating from the wavelength conversion element; and
at least one second color light source, disposed next to the second light combining device and configured to provide at least one second color beam to the second light combining device, wherein the at least one second color beam, the converted beam and the first color beam are transmitted to the at least one condenser lens through the second light combining device.

3. The projection apparatus according to claim 1, wherein each of the plurality of light source modules further comprises:
a first dichroic element, disposed between the first color light source and the wavelength conversion element and configured to allow the first color beam from the first color light source to penetrate therethrough and configured to reflect the converted beam from the wavelength conversion element;
a second dichroic element, disposed on an optical path between the wavelength conversion element and the at least one condenser lens and configured to reflect the first color beam penetrating from the wavelength conversion element;
a second color light source, disposed on one side of the second dichroic element and configured to provide a second color beam to the second dichroic element, wherein the second dichroic element is configured to allow the second color beam to penetrate therethrough;
a third dichroic element, disposed between the second dichroic element and the at least one condenser lens and configured to allow the second color beam penetrating from the second dichroic element and the first color beam to penetrate therethrough and configured to reflect the converted beam from the first dichroic element, so that the second color beam, the converted beam and the first color beam are transmitted to the at least one condenser lens; and
a reflective element, disposed between the second dichroic element and the third dichroic element and configured to reflect the second color beam penetrating from the second dichroic element and the first color beam.

4. The projection apparatus according to claim 1, wherein each of the plurality of light source modules further comprises:
a first dichroic element, disposed between the first color light source and the wavelength conversion element and configured to allow the first color beam from the first color light source to penetrate therethrough and configured to reflect the converted beam from the wavelength conversion element;
a second dichroic element, disposed on an optical path between the wavelength conversion element and the at least one condenser lens and configured to reflect the first color beam penetrating from the wavelength conversion element;
a third dichroic element, disposed between the second dichroic element and the at least one condenser lens and configured to allow the first color beam reflected from the second dichroic element to penetrate therethrough and configured to reflect the converted beam from the first dichroic element, so that the converted beam and the first color beam are transmitted to the at least one condenser lens;

a fourth dichroic element, disposed between the second dichroic element and the third dichroic element and configured to reflect the first color light reflected from the second dichroic element; and a second color light source, disposed on one side of the fourth dichroic element and configured to provide a second color beam to the fourth dichroic element, wherein the fourth dichroic element is configured to allow the second color beam to penetrate therethrough and to be transmitted to the third dichroic element, and the third dichroic element is configured to allow the second color beam to penetrate therethrough and to be transmitted to the at least one condenser lens.

5. The projection apparatus according to claim 1, wherein each of the plurality of light source modules further comprises:

two first dichroic elements, arranged to cross each other and disposed between the first color light source and the wavelength conversion element and respectively configured to reflect the first color beam from the first color light source and reflect the converted beam from the wavelength conversion element and respectively configured to allow the converted beam from the wavelength conversion element to penetrate therethrough and allow the first color beam from the first color light source to penetrate therethrough;

a second dichroic element, disposed on an optical path between the wavelength conversion element and the at least one condenser lens and configured to reflect the first color beam penetrating from the wavelength conversion element;

a third dichroic element, disposed between the second dichroic element and the at least one condenser lens and configured to allow of the first color beam reflected from the second dichroic element to penetrate therethrough and configured to reflect the converted beam from the plurality of first dichroic elements, so that the converted beam and the first color beam are transmitted to the at least one condenser lens;

an optical element, disposed between the second dichroic element and the third dichroic element and configured to reflect the first color beam reflected from the second dichroic element; and at least one second color light source, disposed on one side of at least one of the second dichroic element and the optical element and configured to provide at least one second color beam to at least one of the second dichroic element and the optical element, wherein the optical element is configured to allow the at least one second color beam to penetrate therethrough or reflect the at least one second color beam and to be transmitted to the third dichroic element, and the third dichroic element is configured to allow the at least one second color beam to penetrate therethrough and to be transmitted to the at least one condenser lens.

6. The projection apparatus according to claim 1, wherein the wavelength conversion element of each of the plurality of light source modules has a transmissive wavelength conversion portion and a light transmissive portion, each of a plurality of transmissive wavelength conversion portions is configured to convert a respective one of the plurality of first color beams into the converted beam and configured to allow the converted beam to penetrate therethrough and to be transmitted to the at least one condenser lens, and each of the light transmissive portions is configured to allow a respective one of the plurality of first color beams to penetrate therethrough and to be transmitted to the at least one condenser lens.

7. The projection apparatus according to claim 6, wherein each of the plurality of light source modules further comprises:

a dichroic element, disposed between the wavelength conversion element and the at least one condenser lens and configured to allow the converted beam and the first color beam to penetrate therethrough and to be transmitted to the at least one condenser lens; and a second color light source, disposed on one side of the dichroic element and configured to provide a second color beam to the dichroic element, wherein the dichroic element is configured to reflect the second color beam to the at least one condenser lens.

8. The projection apparatus according to claim 1, wherein the illumination system further comprises a color wheel and a light integration rod, and the color wheel is disposed between the light integration rod and the at least one condenser lens.

9. The projection apparatus according to claim 8, wherein an incident angle of the illumination beam on the light integration rod is between 0° and 30°.

10. An illumination system, comprising:

a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and at least one condenser lens, disposed on transmission paths of a plurality of converted beams from the plurality of wavelength conversion elements and the plurality of first color beams, wherein a plurality of light spots are formed on the at least one condenser lens, and the number of the plurality of light spots is the same as the number of the plurality of light source modules.

11. The illumination system according to claim 10, wherein the wavelength conversion element of each of the plurality of light source modules has a transmissive wavelength conversion portion and a light transmissive portion, each of a plurality of transmissive wavelength conversion portions is configured to convert a respective one of the plurality of first color beams into the converted beam and configured to allow the converted beam to penetrate therethrough and to be transmitted to the at least one condenser lens, and each of the light transmissive portions is configured to allow a respective one of the plurality of first color beams to penetrate therethrough and to be transmitted to the at least one condenser lens.

12. The illumination system according to claim 10, further comprising a color wheel and a light integration rod, wherein the color wheel is disposed between the light integration rod and the at least one condenser lens.

13. The illumination system according to claim 12, wherein an incident angle of an illumination beam on the light integration rod is between 0° and 30°.

14. An illumination system, comprising:
a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and
  at least one condenser lens, disposed on transmission paths of a plurality of converted beams from the plurality of wavelength conversion elements and the plurality of first color beams,
wherein the wavelength conversion element of each of the plurality of light source modules has a reflective wavelength conversion portion and a light transmissive portion, each of the reflective wavelength conversion portions is configured to convert a respective one of the plurality of first color beams into the converted beam and reflect the converted beam, each of the light transmissive portions is configured to allow the respective one of the plurality of first color beams to penetrate therethrough, and each of the plurality of light source modules further comprises:
  a first light combining device, disposed between the first color light source and the wavelength conversion element and configured to allow the first color beam from the first color light source to penetrate therethrough or configured to reflect the first color beam from the first color light source, and configured to reflect the converted beam from the reflective wavelength conversion portion;
  a second light combining device, disposed on an optical path between the wavelength conversion element and the at least one condenser lens and disposed on transmission paths of the converted beam and the first color beam penetrating from the wavelength conversion element; and
  at least one second color light source, disposed next to the second light combining device and configured to provide at least one second color beam to the second light combining device, wherein the at least one second color beam, the converted beam and the first color beam are transmitted to the at least one condenser lens through the second light combining device.

15. An illumination system, comprising:
a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and
  at least one condenser lens, disposed on transmission paths of a plurality of converted beams from the plurality of wavelength conversion elements and the plurality of first color beams,
wherein each of the plurality of light source modules further comprises:
  a first dichroic element, disposed between the first color light source and the wavelength conversion element and configured to allow the first color beam from the first color light source to penetrate therethrough and configured to reflect the converted beam from the wavelength conversion element;
  a second dichroic element, disposed on an optical path between the wavelength conversion element and the at least one condenser lens and configured to reflect the first color beam penetrating from the wavelength conversion element;
  a second color light source, disposed on one side of the second dichroic element and configured to provide a second color beam to the second dichroic element, wherein the second dichroic element is configured to allow the second color beam to penetrate therethrough;
  a third dichroic element, disposed between the second dichroic element and the at least one condenser lens and configured to allow the second color beam penetrating from the second dichroic element and the first color beam to penetrate therethrough and configured to reflect the converted beam from the first dichroic element, so that the second color beam, the converted beam and the first color beam are transmitted to the at least one condenser lens; and
  a reflective element, disposed between the second dichroic element and the third dichroic element and configured to reflect the second color beam penetrating from the second dichroic element and the first color beam.

16. An illumination system, comprising:
a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and
  at least one condenser lens, disposed on transmission paths of a plurality of converted beams from the plurality of wavelength conversion elements and the plurality of first color beams,
wherein each of the plurality of light source modules further comprises:
  a first dichroic element, disposed between the first color light source and the wavelength conversion element and configured to allow the first color beam from the first color light source to penetrate therethrough and configured to reflect the converted beam from the wavelength conversion element;
  a second dichroic element, disposed on an optical path between the wavelength conversion element and the at least one condenser lens and configured to reflect the first color beam penetrating from the wavelength conversion element;
  a third dichroic element, disposed between the second dichroic element and the at least one condenser lens and configured to allow the first color beam reflected from the second dichroic element to penetrate therethrough and configured to reflect the converted beam from the first dichroic element, so that the converted beam and the first color beam are transmitted to the at least one condenser lens;
  a fourth dichroic element, disposed between the second dichroic element and the third dichroic element and configured to reflect the first color light reflected from the second dichroic element; and
  a second color light source, disposed on one side of the fourth dichroic element and configured to provide a second color beam to the fourth dichroic element, wherein the fourth dichroic element is configured to allow the second color beam to penetrate therethrough and to be transmitted to the third dichroic element, and the third dichroic element is configured to allow the second color beam to penetrate therethrough and to be transmitted to the at least one condenser lens.

17. An illumination system, comprising:
a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and
  at least one condenser lens, disposed on transmission paths of a plurality of converted beams from the plurality of wavelength conversion elements and the plurality of first color beams,
wherein each of the plurality of light source modules further comprises:
  two first dichroic elements, arranged to cross each other and disposed between the first color light source and the wavelength conversion element and respectively configured to reflect the first color beam from the first color light source and reflect the converted beam from the wavelength conversion element and respectively configured to allow the converted beam from the wavelength conversion element to penetrate therethrough and allow the first color beam from the first color light source to penetrate therethrough;
  a second dichroic element, disposed on an optical path between the wavelength conversion element and the at least one condenser lens and configured to reflect the first color beam penetrating from the wavelength conversion element;
  a third dichroic element, disposed between the second dichroic element and the at least one condenser lens and configured to allow the first color beam reflected from the second dichroic element to penetrate therethrough and configured to reflect the converted beam from the plurality of first dichroic elements, so that the converted beam and the first color beam are transmitted to the at least one condenser lens;
  an optical element, disposed between the second dichroic element and the third dichroic element and configured to reflect the first color beam reflected from the second dichroic element; and
  at least one second color light source, disposed on one side of at least one of the second dichroic element and the optical element and configured to provide at least one second color beam to at least one of the second dichroic element and the optical element, wherein the optical element is configured to allow the at least one second color beam to penetrate therethrough or reflect the at least one second color beam and to be transmitted to the third dichroic element, and the third dichroic element is configured to allow the at least one second color beam to penetrate therethrough and to be transmitted to the at least one condenser lens.

18. An illumination system, comprising:
a plurality of light source modules, and each of the plurality of light source modules comprising:
  a first color light source, configured to provide a first color beam as an excitation beam; and
  a wavelength conversion element, disposed on a transmission path of the first color beam and configured to convert of the first color beam into a converted beam; and
at least one condenser lens, disposed on transmission paths of a plurality of converted beams from the plurality of wavelength conversion elements and the plurality of first color beams,
wherein the wavelength conversion element of each of the plurality of light source modules has a transmissive wavelength conversion portion and a light transmissive portion, each of a plurality of transmissive wavelength conversion portions is configured to convert a respective one of the plurality of first color beams into the converted beam and configured to allow the converted beam to penetrate therethrough and to be transmitted to the at least one condenser lens, and each of the light transmissive portions is configured to allow a respective one of the plurality of first color beams to penetrate therethrough and to be transmitted to the at least one condenser lens,
wherein each of the plurality of light source modules further comprises:
  a dichroic element, disposed between the wavelength conversion element and the at least one condenser lens and configured to allow the converted beam and the first color beam to penetrate therethrough and to be transmitted to the at least one condenser lens; and
  a second color light source, disposed on one side of the dichroic element and configured to provide a second color beam to the dichroic element, wherein the dichroic element is configured to reflect the second color beam to the at least one condenser lens.

* * * * *